(12) United States Patent
Abramowicz

(10) Patent No.: US 6,435,390 B1
(45) Date of Patent: Aug. 20, 2002

(54) BACKPACK FISHING TACKLE BOX APPARATUS

(76) Inventor: Dean Abramowicz, 211 W. 48$^{th}$ St., Long Beach, CA (US) 90805

( * ) Notice: Subject to any disclaimer, the term of this patent is extended or adjusted under 35 U.S.C. 154(b) by 0 days.

(21) Appl. No.: 09/745,252

(22) Filed: Dec. 19, 2000

(51) Int. Cl.$^7$ .................................................. A45F 3/04
(52) U.S. Cl. ........................ 224/629; 224/651; 224/652; 224/653; 224/657; 224/659; 224/920; 224/922
(58) Field of Search ................................. 224/576, 628, 224/629, 651, 652, 653, 654, 657, 658, 659, 920, 921, 922

(56) References Cited

U.S. PATENT DOCUMENTS

| | | | |
|---|---|---|---|
| 2,792,980 A | * | 5/1957 | Brown ........................ 224/235 |
| 2,823,971 A | * | 2/1958 | Hoyt ........................... 224/629 |
| 3,062,421 A | | 11/1962 | Fleming |
| 3,148,811 A | | 9/1964 | Foltz |
| 3,151,790 A | | 10/1964 | Mavrakis |
| 3,201,017 A | | 8/1965 | Morrissey |
| 3,401,857 A | | 9/1968 | Wilson et al. |
| 4,208,826 A | | 6/1980 | Lindaman |
| 4,529,112 A | | 7/1985 | Miller |
| 4,892,241 A | | 1/1990 | Mavrakis |
| 5,004,134 A | * | 4/1991 | Barry ........................ 224/235 |
| 5,012,964 A | * | 5/1991 | Falletta et al. .............. 224/153 |
| 5,044,537 A | * | 9/1991 | Bufalo ...................... 220/4.27 |
| 5,628,443 A | * | 5/1997 | Deutsch ..................... 150/113 |
| 5,630,537 A | | 5/1997 | Sciacca |
| 5,636,469 A | | 6/1997 | Pizzolo et al. |
| D396,745 S | | 8/1998 | Peterson |
| 5,823,337 A | | 10/1998 | Yunger et al. |
| 5,988,476 A | * | 11/1999 | Olerio ........................ 108/107 |
| 6,052,939 A | | 4/2000 | McClain et al. |
| D423,779 S | | 5/2000 | Goatcher |
| 6,196,437 B1 | * | 3/2001 | Smith, III .................. 224/241 |
| 6,217,113 B1 | * | 4/2001 | Knatz ........................ 224/155 |
| 6,267,276 B1 | * | 7/2001 | Cook .......................... 224/162 |

* cited by examiner

Primary Examiner—Stephen Cronin
(74) Attorney, Agent, or Firm—Fulwider, Patton Lee & Utecht, LLP

(57) ABSTRACT

A backpack apparatus including a rigid box with a hinged lid for access downwardly into and having a canopy surmounted on such lid to define an accessible storage compartment the lid. A pair of shoulder straps are mounted to the front side of such canopy and box.

26 Claims, 4 Drawing Sheets

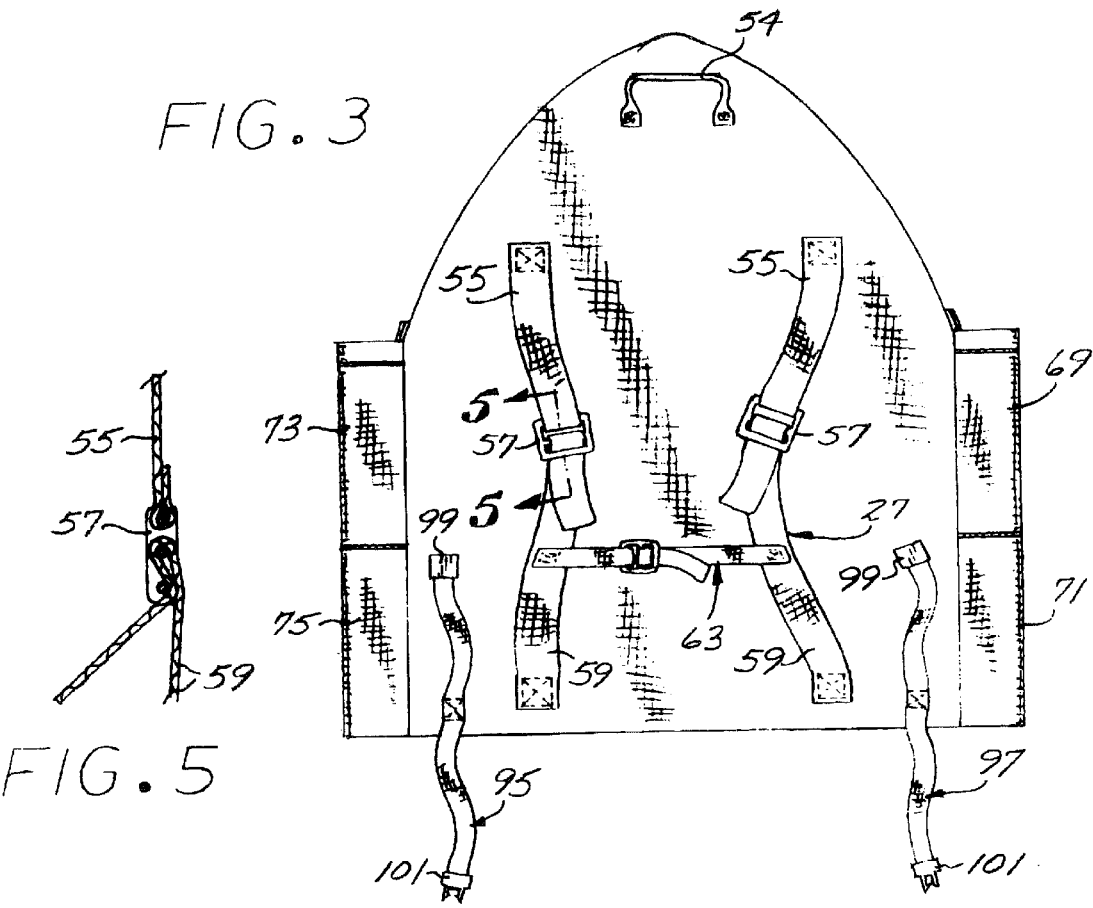
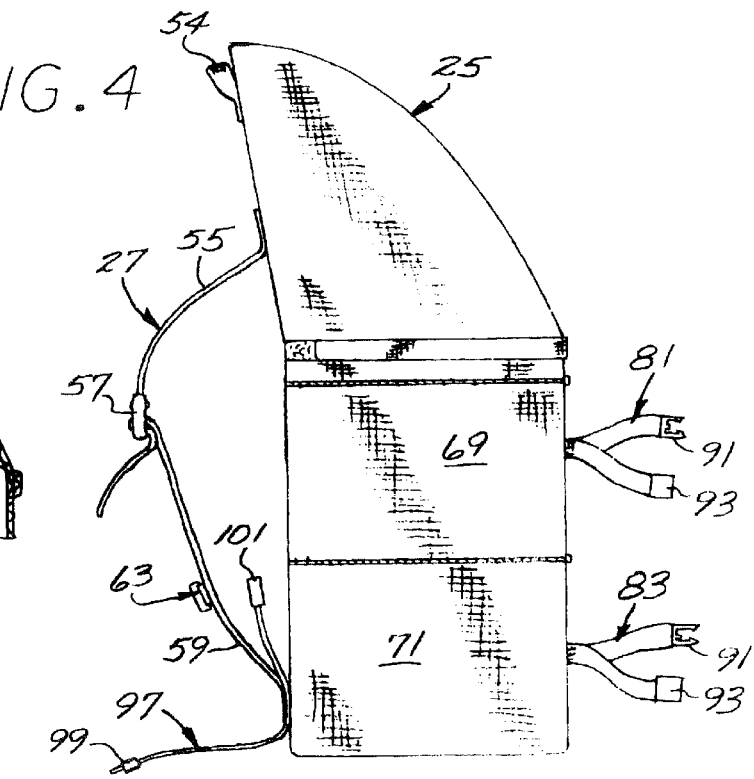

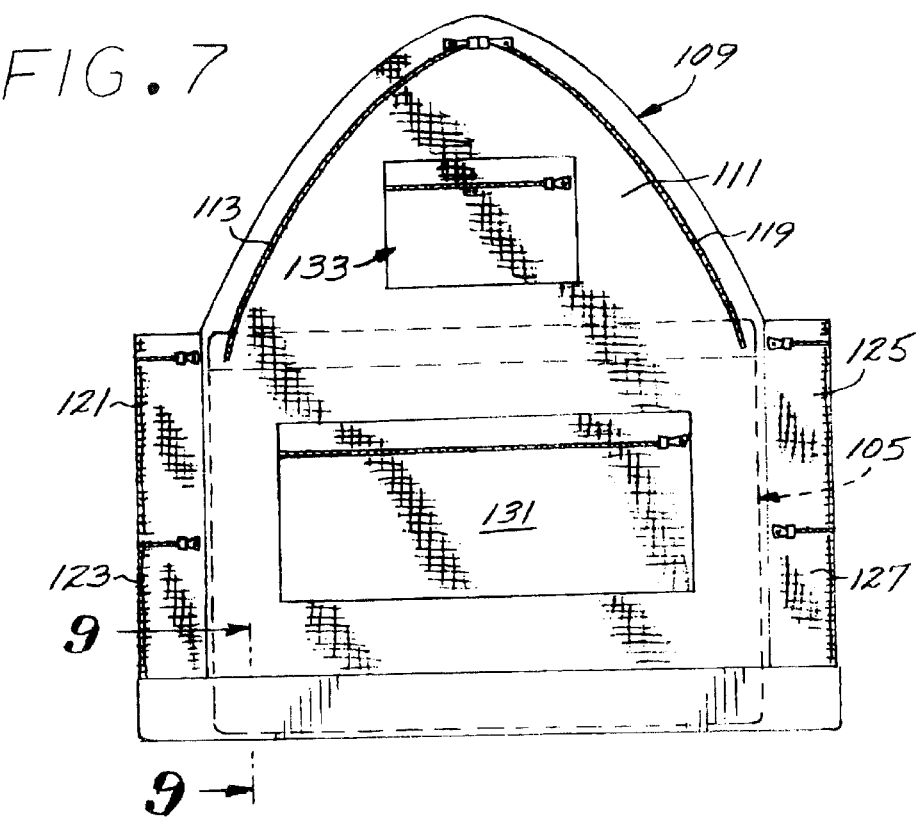
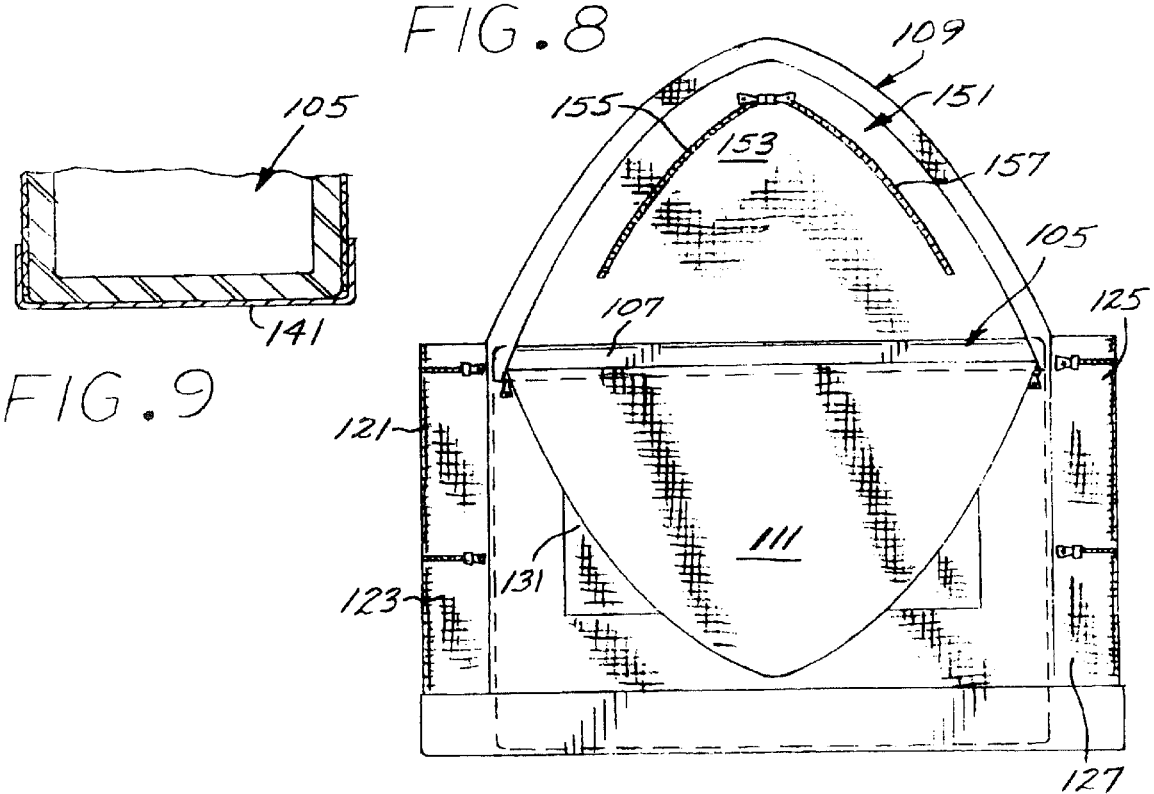

BACKPACK FISHING TACKLE BOX APPARATUS

BACKGROUND OF THE INVENTION

1. Field of the Invention

The present invention relates to portable containers and particularly those used for housing food and beverages and/or fishing tackle.

2. Description of the Prior Art

To enhance the enjoyment of one's leisure time, it is often important that various equipment and things be easily toted by an individual on an outing such as a picnic or fishing expedition.

To this end, various different styles of portable bait containers and tackle box have been proposed. Also, numerous different styles of coolers, beverage containers and food sacks have been devised.

As an example, it has long been the practice of sportsmen or sportswomen on an outing to carry a fishing tackle box which might have numerous different storage compartments in drawers and trays to organize various lures, sinkers, fishing hooks and baits for ready access at the moment when various fishing conditions and challenges are encountered. It has also been common practice to tote along a rigid walled, thermally insulated cooler for carrying ones food stuff and beverages. Along with this paraphernalia, the fisherman must also carry one or more fishing rods, fishing nets and sometimes extra jackets, clothing or rain wear in the event inclement weather is encountered. This then serves to occupy the fisherman's hands and prevents ready access to the fishing rods and tackle which enhances the excitement and entertainment afforded by the leisure time outing.

In recognition of the need for convenient portable tackle boxes, various different devices have been proposed for suspension from a fisherman's shoulder, neck, back or the like. Examples of tackle boxes to be supported from one shoulder or the other of the fisherman includes a fishing tackle box to be suspended from one shoulder to reside at the hip. A device of this type is shown in U.S. Pat. No. 3,062,421 to Fleming. Such tackle boxes suffer the shortcoming that the storage space therein is quite limited. The stuff stored therein is not arranged for ready access when such box is opened.

Other tackle boxes have been proposed to be suspended from one's neck, positioned forward of the abdomen and readily accessible from the top. A device of this type is shown in U.S. Pat. No. 4,208,826 to Lindaman. Such tackle boxes suffer the shortcoming that disposition in the front of the fisherman's abdomen creates a hindrance to convenient movement and makes walking and maneuvering about somewhat of a challenge.

It has also been proposed to provide a tackle box suspended on edge and having a tray with multiple compartments opened to the side and covered by a lid and which may be positioned in a horizontal position to pivotably open such lid. A device of this type is shown in U.S. Pat. No. 3,151,790 to Mavrakis. Such tackle boxes, again, have restricted utility since, when upright on its edge, the stored paraphernalia will be shifted to one side and, when such box is reoriented to its horizontal position, such paraphernalia will be re-shifted in the compartments and intermixed.

Efforts have been made to solve the difficulties encountered in devising a tackle box arrangement to be carried conveniently and comfortably from the fisherman's person while moving about on, for instance, a boat deck or other public area to reach a favorite fishing location, such as along the rail of a recreational fishing boat. It has been proposed to configure a fishing tackle box in the form of a box shaped structure having an open main compartment covered by a top lid that is openable. Devices of this type are shown in U.S. Pat. No. Des. 396,745 to Peterson, Des. 423,779 to Goatcher and U.S. Pat. No. 6,052,939 to McClain et al. Such devices, while satisfactory for their intended purposes, have not gained any degree of commercial success due, in great part, to the impractical configuration which affords only limited segregated storage compartments and would result in intermixing of the fishing paraphernalia thus often resulting in a relatively disorganized intermixing thereof so that ready access cannot typically be had to the paraphernalia of choice at the time the fisherman desires to gain access thereto. The situation is often exacerbated by the fact that fisherman perceive it important to have access to quick change of bait, lures and augmenting gear so that highly promising fishing opportunities are not missed. This situation can arise when a school of fish is encountered or when it is determined that it is desirable to quickly change bait, weights, depth or augmenting paraphernalia. In the excitement, the fisherman will want quick access to paraphernalia stored in an organized manner.

In effort to facilitate organization of the fishing lures and the like, a fishing tackle box in the form of a knapsack has been proposed having a relatively large number of disassembleable modular components. Such a device has been proposed with columns of spaces defined by modular walls having horizontal rails for receipt of multiple individual containers which may be themselves removed and access had thereto for removal of items stored therein. A pair of shoulder straps are provided for mounting to the fisherman's back. A device of this type is shown in U.S. Pat. No. 5,630,537 to Sciacca. While serving to provide a rack to organize individual containers, such a device has not received great acceptance in the marketplace. Access to the individual containers is quite restricted and ready access cannot be had from the top side of the stored paraphernalia.

Thus, there exists a need for a readily and conveniently portable container which may be easily toted from the back of a user and which incorporates readily accessible individual drawers and at least one tray readily accessible from the top.

SUMMARY OF THE INVENTION

The present invention is characterized by a box having a plurality of rearwardly slidable drawers, a top tray covered by a hinged lid and a canopy surmounted on such lid forming a compartment for receipt and storage of food stuffs and the like to be enjoyed by the fisherman during a fishing outing.

DESCRIPTION OF THE DRAWINGS

FIG. 3 is a back view of the backpack apparatus shown in FIG. 1;

FIG. 4 is a right hand side view of the backpack apparatus shown in FIG. 1;

FIG. 5 is a vertical sectional view, in enlarged scale, taken along the line 5—5 of FIG. 3;

FIG. 6 is a transverse sectional view taken along the line 6—6 of FIG. 1;

FIG. 7 is a back view of a second embodiment of the backpack apparatus of the present invention;

FIG. 8 is a back view similar to FIG. 7; and

FIG. 9 is a fragmentary vertical sectional view taken along the line 9—9 of FIG. 7.

DESCRIPTION OF THE PREFERRED EMBODIMENTS

Figure 2:
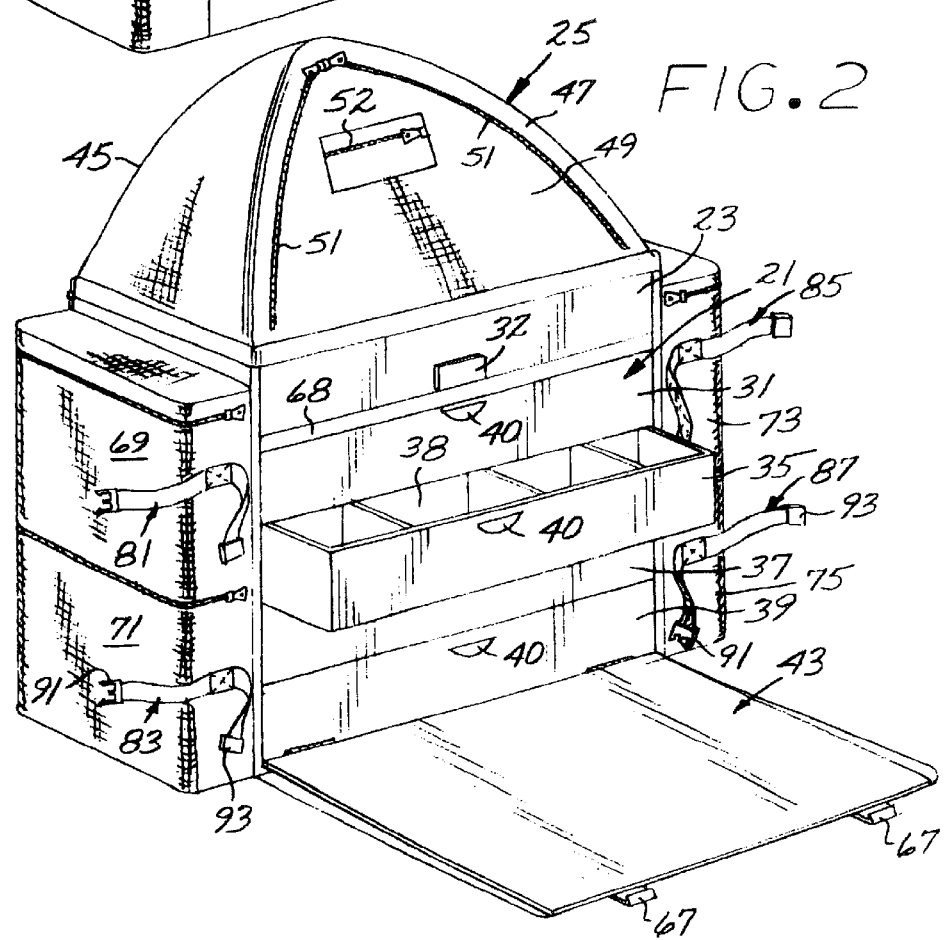
FIG. 2 is a perspective view similar to FIG. 1 but showing the drawers partially opened.

Referring to FIGS. 2 and 4, the backpack apparatus of the present invention includes, generally, a rigid storage box 21 having a hinged lid 23 surmounted by a flexible wall canopy 25 and having a pair of shoulder straps 27 mounted to the front wall thereof.

It is a characteristics of the sport of fishing that it is important to the fisherman that he or she have ready access to the various paraphernalia important to the enjoyment and success of a fishing expedition. This is particularly true for salt water fishing where a group of fishermen may board a fishing boat to be transported to the fishing site where individual rods are rigged and lures and baits deployed to the location and depth preferred by the individual fisherman. For a sports fishing boat of substantial size, the fishermen may want to move fore and aft along the rail of the boat or from starboard to port or visa versa where he or she believes the best fishing opportunity exists. It is often not practical for the fishing participant to store his or her tackle at some location on a public fishing craft and to return periodically thereto during the outing. That is, when the boat encounters a school of fish along one side or the other of the boat, the individual fisherman will want to have a great degree of maneuverability to shift from one location to another. Also, in the event a lure or weight or bait is lost, the fisherman will want quick access to the fishing tackle without the necessity of leaving a spot along the rail for the purpose of retrieving desired paraphernalia from a locker or other different location. To this end, it is desirable for the fisherman to have with him or her a box containing the desired paraphernalia in an organized manner. It this need to which the backpack apparatus of the present invention addresses itself.

The tackle box 21 is preferably constructed of rigid plastic having horizontal mounting rails spaced vertically therein for slidable receipt of four compartmentalized drawers 31, 35, 37 and 39. Each individual drawer includes multiple compartments 38 and a pull handle 40 on the front wall thereof.

Figure 2A:
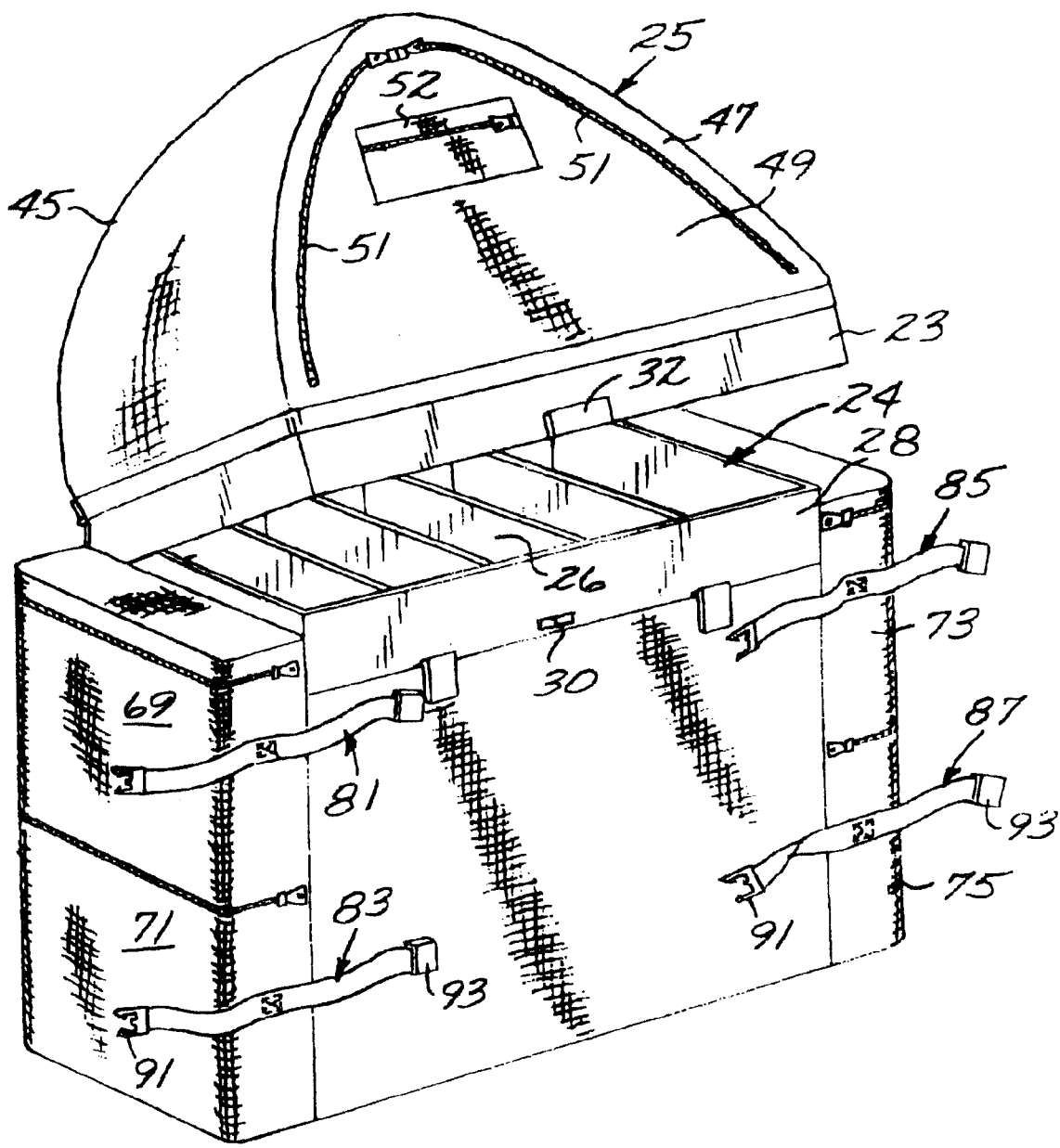
FIG. 2A is a perspective view similar to FIG. 1 but showing the lid open.

The box includes under the lid 23 a tray, generally designated 24, divided into upwardly opening compartments 26 covered by the hinged lid 23. Mounted on a panel 28 at the front of such tray is a catch 30 for cooperating with a latch 32 mounted on the front of such lid 23 (FIG. 2A).

The canopy 25 is surmounted on the lid 23 and is in the form of an arched pyramidal shaped canvas enclosure having a hood 45 covering the forward and side portions thereof and aback wall 47 incorporating an arch shaped back panel 49 zippered in place by a closure zipper 51. It will be appreciated that the closure zipper 51 may take many different forms and can be in the form of a hook and loop fabric, snap connectors or the plastic zipper 51 shown. The zipper can be in multiple components, such as with two sections that can be opened from the top apex of the arch. Mounted centrally on the panel is a zippered pouch 52 for receipt of fishing licenses and the like.

Mounted to the top of the canopy 25 at the front thereof is a hand grasp handle 54 (FIG. 3) for lifting of the backpack apparatus for toting thereof when not mounted on the fisherman's back.

Mounted to the front wall of the canopy 25 are a pair of shoulder strap segments 55 which join with respective buckles 57 mounted at the free extremities of respective straps 59 secured at their respective bottom extremities to the lower portion of a fabric panel covering the front side of the tackle box 21. A tethered strap, generally designated 63, joins the straps 59 in the intermediate portion thereof to limit separation thereof.

Mounted to the bottom of the box 21 at the rear side thereof is the rigid door 43. Such door 43 mounts at the top end thereof respective plastic snap latches 67 which latch over the top edge of a latch rail 68 on the front panel of the box above the top drawer 31.

Mounted to the opposite sides of the box 21 are canvas-like fabric panels which carry respective zippered pouches, 69, 71, 73 and 75. These pouches may be opened individually for access to additional fishing paraphernalia or food stuffs during the fishing trip.

Attached to the back of the respective pouches 69–75 in vertically spaced relationship are respective straps, generally designated 81, 83, 85 and 87, having forked plastic male and female fasteners 91 and 93, respectively, at the free extremities thereof for passing around, for instance, a disassembled fishing rod for secure carrying thereof. In the preferred embodiment, such straps are elastic to be stretched about such rods.

Similarly, mounted at the back of the front wall of the tackle box is a pair of straps, generally designated 95 and 97, which likewise include respective male and female fasteners 99 and 101, again for mounting fishing poles or other elongated objects.

From the foregoing, it will be appreciated that the backpack apparatus of the present invention is particularly convenient for toting of fishing paraphernalia or the like. The compartments in the drawers 31, 35, 37 and 39 may be loaded with lures, fish hooks, weights, spinners, all divided by their various sizes and forms and categorized in an organized manner for ready access thereto depending on the fishing climate, sunlight, time of the day and particular strain of fish being addressed.

The larger paraphernalia, such as large lures, knives, pliers and the like can be conveniently organized in the compartments 26 located in the top tray covered by the lid 23.

Additional items, such as extra or alternate reels, beverages, sandwiches and the like can be placed in the canopy 25. To this end, if desirable, a rigid or soft walled heavily insulated cooler can be provided for ready receipt therein. It will be appreciated that the zipper 51 may be unzipped to open the panel 49 for ready access to the compartment within the canopy 25.

Additional paraphernalia can be separated and organized and stored in the respective side pouches 69–76.

Fishing rods of various weight and length may be taken along on the fishing expedition and may be conveniently strapped in one or the other of the various straps 81–83, 85–87 or 95–97.

Once the drawers and tray are loaded, the door 43 may be closed to hold the drawers 31–39 in their closed position. The fisherman may then don the backpack apparatus by placing the respective shoulder straps over his or her shoulders. Referring to FIG. 3, it will be appreciated that with the top extremity of the shoulder strap anchored well (about three inches) above the top of the tackle box, the weight carried in such box will be well balanced and suspended, to a great extent, in pendulum form from the wearer's shoulders. The fisherman may then go about his or her business in boarding the fishing boat, locating the desirable fishing location, preparing his or her fishing rod, mounting the reel and selecting the desired lure, weight or spinner. It will be appreciated that the fisherman can momentarily remove the backpack apparatus from his or her back and can have quick and ready access to the upwardly opening compartments of the various drawers 31–39 by merely unlatching the latches 67 and opening the door 43. Once the paraphernalia is selected, the fisherman can go about his or her exercise of angling skills. If desired, the backpack apparatus may be easily remounted to the fisherman's back to be maintained in location and readily available in the event of a bait or lure change or the like. Then, when lunch time rolls around or it is desirable to mount another reel, access can be had to the food stuff or any extra reels stored in the canopy.

Figure 1:
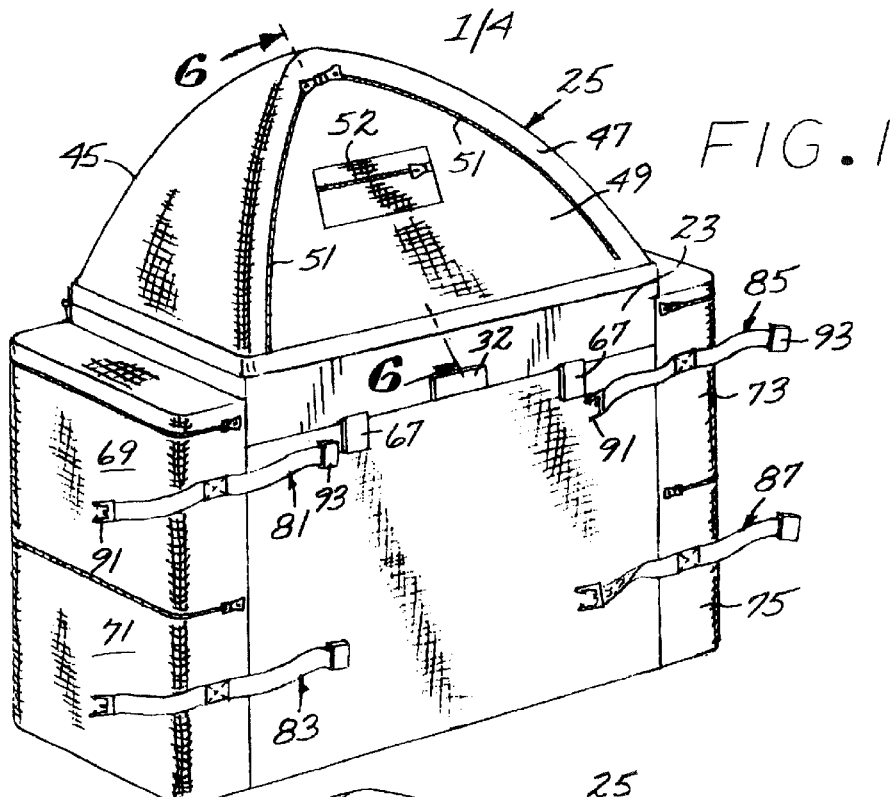
FIG. 1 is a perspective view of a backpack apparatus embodying the present invention showing the lid closed.

Referring to the embodiment of the backpack apparatus of the present invention as shown in FIGS. 7–9, it will be appreciated that the box, generally designated 105, is in the form of a thermally insulated cooler for receipt of food stuffs and incorporates a hinged top lid 107. The box is housed in a canvas receiver incorporating the generally rectangular bottom sack and a canvas canopy, generally designated 109, surmounted on the lid 107. The canopy 109 is shaped and configured similar to the canopy 25 shown in FIGS. 1 and 2 and includes aback panel 111 which is arch shaped to complement the arcuate pyramidal shape of the canopy 109. Such flap is closed by pair of arcuate zippers 113 and 119 and is so configured in place that it can be unzipped and laid down rearwardly over the back of the backpack itself.

Mounted to the opposite sides of the rectangular sack carrying the cooler 105 are a plurality of side pouches 121, 123, 125 and 127. As with the apparatus shown in FIGS. 1 and 2, these pouches are zippered and may be used for storage of food, fishing paraphernalia, reels and the like.

Mounted to the back wall of the sack carrying the cooler 105 is a zippered auxiliary pouch 131. Also, mounted to the back side of the panel 111 is a small tools pouch, generally designated 133.

If desired, the bottom of the backpack apparatus can include a pan shaped plastic protector 141 (FIG. 9) for resisting dirt, moisture and the like when the cooler is set on the ground or on the boat deck or the like.

In operation, the backpack apparatus in the configurations shown in FIGS. 7–9 may be utilized similar to the apparatus shown in FIGS. 1–6. That is, the zippers 113 and 119 may be unzipped to expose the interior of the canopy 109. In the preferred embodiment, a fabric thermally insulated flexible wall cooler, generally designated 151, is configured to complement the interior shape of the canopy 109 and is, itself, formed with a closure panel 153 closed in position by respective zippers 155 and 157. In use, the cooler 151 may be removed to afford access to the lid 107. The canopy 109 is configured with abundant interior space to accommodate opening of the lid 107 so that access can be had to the interior of the cooler.

Thus, food stuffs can be stored in the cooler 151. It will be appreciated that a pair of shoulder straps, similar to the straps shown in FIG. 3, are mounted to the front wall of such backpack apparatus for convenient mounting of the cooler style backpack apparatus from the fisherman or other outdoor enthusiast. In the preferred embodiment, the top ends of such straps are anchored to the front wall of the canopy 109 for good balance.

From the foregoing, it will be appreciated that the backpack apparatus of the present invention provides a convenient and inexpensive means for toting foods, beverages and fishing tackle items to a remote location such that the outdoors person can have ready access thereto.

What is claimed is:

1. A backpack fishing tackle box apparatus for suspension on the back of a fisherman and comprising:
    a fishing tackle box including front and side walls, a top lid having a front edge and a rearward free extremity, said lid being hinged at the front edge to said front wall and configured to swing the free extremity upwardly, said box further including a plurality of stacked horizontal drawers disposed below said top lid and slidable rearwardly for access thereto;
    a flexible top canopy mounted on said lid and including front, back and side walls projecting upwardly therefrom to form a surmounted storage compartment;
    an openable rear panel in said back wall;
    a closure for closing said rear panel; and
    shoulder straps mounted from said front wall of said box and said canopy to support said apparatus from the back of said fisherman.

2. A backpack fishing tackle box apparatus as set forth in claim 1 wherein:
    said top canopy is constructed of fabric.

3. A backpack fishing tackle box apparatus as set forth in claim 1 wherein:
    said canopy includes side panels secured to the opposite sides of said fishing tackle box.

4. A backpack fishing tackle box apparatus as set forth in claim 1 that includes:
    pouches mounted on the opposite sides of said fishing tackle box.

5. A backpack fishing tackle box apparatus as set forth in claim 1 wherein:
    said closure includes a zipper.

6. A backpack fishing tackle box apparatus as set forth in claim 1 that includes:
    releasable straps mounted to said fishing tackle box for securing fishing rods thereto.

7. A backpack fishing tackle box apparatus as set forth in claim 1 wherein:
    said shoulder straps include adjustment buckles.

8. A backpack fishing tackle box apparatus as set forth in claim 1 that includes:
    a handle mounted on said front wall of said canopy.

9. A backpack fishing tackle box apparatus as set forth in claim 1 wherein:
    said back wall of said canopy slopes upwardly and forwardly.

10. A backpack fishing tackle box apparatus as set forth in claim 1 wherein:
    said fishing tackle box is constructed with rigid front and side walls.

11. A backpack fishing tackle box apparatus as set forth in claim 1 wherein:
    said canopy is secured to said lid and so constructed as to provide for opening of said lid.

12. A backpack apparatus as set forth in claim 1 wherein:
    said rear panel is generally arch shaped to be formed with an upwardly disposed apex; and
    said closure includes a pair of zippers for zipping downwardly in an opposite direction from said apex.

13. A backpack apparatus as set forth in claim 1 wherein:
said box is in the form of a plastic cooler including thermally insulated walls.

14. A backpack fishing tackle box apparatus as set forth in claim 1 that includes:
a door secured along one edge to said box for, when closed, covering said drawers.

15. A backpack fishing tackle box apparatus as set forth in claim 14 wherein:
said door is rigid.

16. A backpack fishing tackle box apparatus as set forth in claim 14 wherein:
said door includes latches on its free edge for releasable attachment to said box.

17. A backpack fishing tackle box apparatus as set forth in claim 16 wherein:
said latches are constructed of plastic.

18. A backpack apparatus including:
a box constructed with rigid front, side walls and a back wall and including a lid hinged along its rearward edge to said back wall;
a flexible canopy surmounted to said lid and including canopy front, back and side walls cooperating to form a storage compartment over said lid;
an openable panel in said canopy back wall;
a closure for closing said panel; and
shoulder straps mounted in laterally spaced relationship to the front wall of said box and said canopy to facilitate mounting to the back of a wearer.

19. A backpack apparatus as set forth in claim 18 wherein:
said closure includes a zipper.

20. A backpack apparatus as set forth in claim 18 wherein:
said canopy is constructed of fabric.

21. A backpack apparatus as set forth in claim 18 wherein:
said panel is so configured and arranged to, when said closure is released, will lay over said lid of said box.

22. A backpack apparatus as set forth in claim 18 wherein:
said box is in the form of a fishing tackle box having rearwardly sliding drawers.

23. A backpack apparatus as set forth in claim 18 that includes:
a cover for releasably covering said drawers to hold them closed.

24. A backpack apparatus as set forth in claim 18 that includes:
an auxiliary pouch mounted rearwardly on said box.

25. A backpack apparatus as set forth in claim 18 that includes:
an auxiliary pouch mounted on said panel.

26. A backpack apparatus as set forth in claim 18 wherein:
the walls of said canopy cooperate to form a pyramidal shape;
said back panel of said canopy is generally arch shaped and wherein said apparatus includes:
a thermally insulated flexible auxiliary cooler configured to be received in complementary relationship within said storage compartment.

* * * * *